United States Patent [19]

Mozume et al.

[11] Patent Number: 5,144,603
[45] Date of Patent: Sep. 1, 1992

[54] OPTICAL HEAD INCORPORATING REFRACTIVE INDEX DISTRIBUTION CHANGEABLE LENS

[75] Inventors: Teruo Mozume, Yokohama; Isao Ohbu, Hachioji, both of Japan

[73] Assignee: Hitachi, Ltd., Tokyo, Japan

[21] Appl. No.: 663,596

[22] Filed: Mar. 1, 1991

[30] Foreign Application Priority Data

Mar. 7, 1990 [JP] Japan .................... 2-053611
Mar. 30, 1990 [JP] Japan .................... 2-080949

[51] Int. Cl.$^5$ .............................................. G11B 7/00
[52] U.S. Cl. ............................ 369/44.14; 369/44.12; 369/109; 369/112
[58] Field of Search ............... 369/112, 109, 103, 100, 369/110, 44.11, 44.14, 44.12, 44.22; 350/162.2, 413, 412, 417, 448, 109, 96.11–96.14

[56] References Cited

U.S. PATENT DOCUMENTS

| | | | |
|---|---|---|---|
| 4,108,622 | 8/1978 | Martin | 350/413 |
| 4,166,254 | 8/1979 | Bjorklund | 372/24 |
| 4,728,167 | 3/1988 | Soref et al. | 350/96.14 |
| 4,747,090 | 5/1988 | Yamashita et al. | 369/44.12 |
| 4,784,451 | 11/1988 | Nakamura et al. | 350/96.14 |
| 4,795,225 | 1/1989 | Sakai et al. | 350/96.14 |
| 4,855,986 | 8/1989 | Taki | 369/112 |
| 4,862,440 | 8/1989 | Miyamoto et al. | 369/44.12 |
| 4,887,877 | 12/1989 | Inoue et al. | 350/96.11 |

FOREIGN PATENT DOCUMENTS

| | | | |
|---|---|---|---|
| 0047835 | 3/1987 | Japan | 369/44.12 |
| 0020736 | 1/1988 | Japan | 369/112 |
| 0311429 | 12/1989 | Japan | 369/109 |
| 0035634 | 2/1990 | Japan | 369/109 |

Primary Examiner—Roy N. Envall, Jr.
Assistant Examiner—Thang V. Tran
Attorney, Agent, or Firm—Fay, Sharpe, Beall, Fagan, Minnich & McKee

[57] ABSTRACT

An optical head using a refractive index distribution changeable lens by which light focused on a recording surface of an optical disc is precisely and positionally controlled. The refractive index distribution of this refractive index distribution changeable lens is changed by changing an electric field applied thereto so as to precisely displace the position of the focus point of the emitted light on the recording surface of the optical disc.

15 Claims, 8 Drawing Sheets

FIG. I
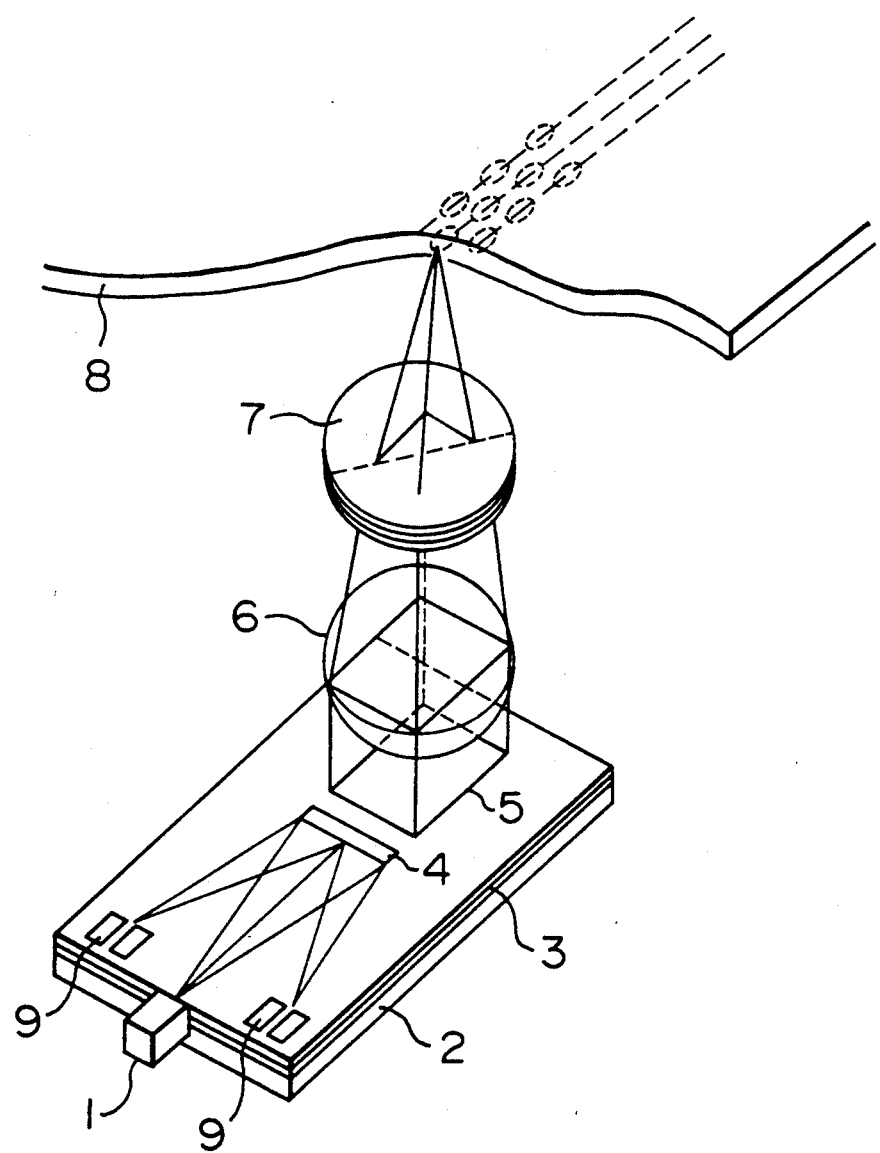

OPTICAL HEAD INCORPORATING REFRACTIVE INDEX DISTRIBUTION CHANGEABLE LENS

BACKGROUND OF THE INVENTION

The present invention relates to an optical head for recording and reproducing information onto and from an information recording medium, and particularly to an optical head which is suitably used for optic integration.

Heretofore, there has been used, for example, an optical head as shown in FIG. 10. Light emitted from a laser diode 11 is turned into a parallel beam by a collimator lens 12. Then the emitted light beam is turned in its direction by a prism mirror lens 13, and is then focused onto an optical disc 15 by an objective lens 14. Light beam reflected from the surface of the optical disc is returned through the light path through which the emitted light beam is transmitted, and is further reflected by the combination of a quarter wavelength plate 16 and a polarizing beam splitter 17 to a focusing lens 18 for focusing the reflected light beam onto a photodiode 19, without being returned to the laser diode 11. Accordingly, information can be read from the disc.

However, the above-mentioned optical head in which lenses, mirrors and the like are three-dimensionally arranged, is not easily miniaturized or lightweight.

Accordingly, in order to make the optical head miniature or lightweight, an integrated optical head has been proposed as disclosed in Journal of the Institute of Electronics and Communication Engineers of Japan, Vol. J-86-C, 803, 1985, which is shown in FIG. 11. In this Figure, there are shown a semiconductor laser 21 as a light source, a light wave guide 22 for guiding light emitted from the semiconductor laser 21, a grating type focusing beam splitter 23 provided on the light wave guide 22, a focusing coupler 21 provided on the light wave guide 22, an optical disc 25, and a pair of light receiving elements 27 formed on an Si substrate 26. With the optical head as shown in FIG. 11, a light beam emitted from the semiconductor laser 21 transmits through the light wave guide 22 and is then incident upon the grating type focusing beam splitter 23. At this stage, zero-order light which is not diffracted is focused onto the optical disc 25 outside of the light wave guide 22 by means of the focusing coupler 24. Light reflected from the optical disc 25 is focused by the focusing coupler 24, and is transmitted through the light wave guide 22 in the direction reverse to the direction of the emitted light. Further, the direction of transmission of the reflected light is changed by the grating type focusing beam splitter 23, and is focused onto the two pairs of light receiving elements 27.

In the above-mentioned integrated optical head, a focusing and tracking drive mechanism which comprises a movable component composed of a drive coil and a permanent magnet, has to move the integrated optical head substrate in its entirety, and accordingly, it is difficult for the whole optical head including this drive mechanism to be miniaturized and lightweight and to be made to be cheap. Further, it is not suited to mass-production. That is, there has been a problem of insufficiently utilizing the advantages of the integrated optical head. Conventionally, there has been proposed an integrated optical head including a beam deflecting means which utilizes electro-optical effects or the like so as to integrate components corresponding to the above-mentioned drive components on a substrate. However, since this conventional integrated optical head uses a grating coupler as an objective lens, the diffraction of the focusing grating coupler varies with the deflection of the beam, and accordingly, focused beam aberrations occur.

SUMMARY OF THE INVENTION

The present invention is devised in view of the above-mentioned problems inherent to the prior art, and accordingly, one object of the present invention is to provide a miniature and lightweight optical head.

To the end according to the present invention, an optical head comprises a substrate on which an light wave guide for guiding laser light emitted from a laser source and a grating coupler for converting the light guided by the light wave guide into a parallel light beam and for radiating the parallel light into an external space are integrated; an objective lens for focusing the externally radiated light beam onto a surface of an optical disc; and an refractive index distribution changeable lens for microadjusting a focus point of the focused light beam on the surface of the optical disc.

With this arrangement, the optical head according to the present invention can be made to be lightweight, and accordingly, it can be mounted on a slider bearing similar to that used for a magnetic disc unit head. Thus, a rough adjustment for focusing light incident upon the surface of the disc can be made by use of air bearing caused by relative running of the disc, and then microadjusting the focus point can be made by the above-mentioned refractive index distribution changeable lens.

According to the present invention, the optical head can be made to be miniature and lightweight, by integrating a light wave guide, a grating beam splitter, a grating coupler and a photodetector on one and the same substrate, and accordingly, the optical head can be positioned just above the surface of the optical disc with the use of an air bearing effect caused by relative running of the disc so as to surely follow up the surface of the optical disc without out-of-focus caused by a warp and an undulation on the surface of the disc. Further, by feed-back of a focus error signal which can be detected by the photodetector, the intensity of an electric field applied to the refractive index distribution changeable lens is changed, and accordingly, a microadjustment for focusing can be made.

BRIEF DESCRIPTION OF THE DRAWINGS

These and other objects, advantages, features, and uses will become more apparent as the description proceeds, when considered with the accompanying drawings in which:

FIG. 1 is a perspective view illustrating a first embodiment of the present invention;

FIG. 2b is a sectional view illustrating a variant form of the refractive index distribution changeable lens shown in FIG. 2a;

FIG. 3a is a plan view illustrating an electrode pattern applied on the lens shown in FIG. 2a;

FIG. 3b is a plan view illustrating a variant form of the electrode pattern shown in FIG. 3a;

FIGS. 4 and 5 are sectional views illustrating further variants form of the lens shown in FIG. 2a;

DETAILED DESCRIPTION OF THE PREFERRED EMBODIMENTS

Figure 2A:
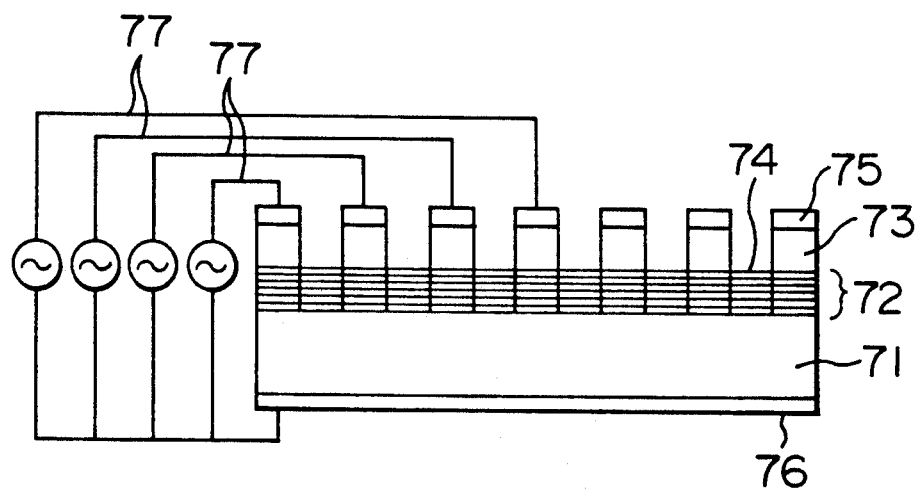
FIG. 2a is a sectional view illustrating a refractive index distribution changeable lens used in the arrangement shown in FIG. 1.

Referring to FIG. 1 to 6, explanation will be made of a first embodiment of the present invention.

FIG. 1 is a schematic perspective view illustrating an optical head 1 in the first embodiment of the present invention.

A semiconductor laser 1 is attached to one end part of a substrate 2 made of $LiNbO_3$, and a light wave guide 3 is formed by uniformly dispersing Ti into the substrate 2 from the outer surface of the latter. Further, the light wave guide 3 is formed therein with a grating beam splitter 4 and a grating coupler 5. Further, an focusing lens 6 and a refractive index distribution changeable lens 7 are arranged above the grating coupler 5.

In this arrangement, light emitted from the semiconductor laser 1 is transmitted through the wave guide to the grating beam splitter 4. Then the light is diffracted by the grating coupler 5 and focused onto the outer surface of an optical disc 8 through the focusing lens 6 and the refractive index distribution changeable lens 7. Light reflected from the outer surface of the optical disc 8 is then returned through the refractive index distribution lens 7 and the focusing lens 6 to the light wave guide 3 by means of the grating coupler 6. The reflected light is transmitted through the light wave guide 3 and onto the grating beam splitter 4. Since the grating beam splitter 4 is a Bragg diffraction grating, the first order diffracted light is directed toward two pairs of photodetectors 9 integrated on the substrate 2. With these two pairs of photodetectors 2 detect a recorded signal, a focusing error signal, a tracking error signal and the like. The focusing error signal obtained by the photodetectors 9 is converted into a voltage and applied to the refraction index distribution changeable lens 7 by means of an external circuit not shown. Thus, the focusing error signal is fed back to change the refractive index distribution of the refraction index distribution changeable lens to adjust the focus point of the light to adjust, thereby it is possible to prevent the focus point from being deviated from the disc surface.

Figure 2B:
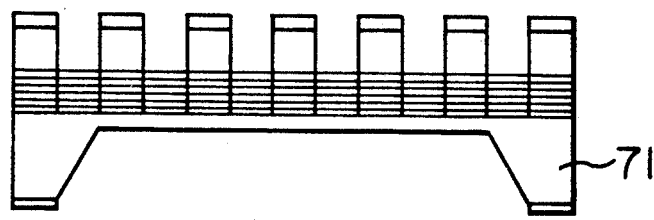

FIG. 2a a sectional view illustrating the refraction index distribution changeable lens having a semiconductor multi-layer type structure. In this figure, there are shown a substrate 71, a multiple quantum well layer 72, a cap layer 73, an insulating area 74, upper electrodes 75, a lower electrode 76 and an external circuit 77 for applying a voltage to the electrodes 75, 76. FIG. 2b is sectional view illustrating a variant form of the lens shown in FIG. 2a, in which a part of the substrate 71 is removed by etching in order to improve the transmission of light passing therethrough.

Figure 3A:
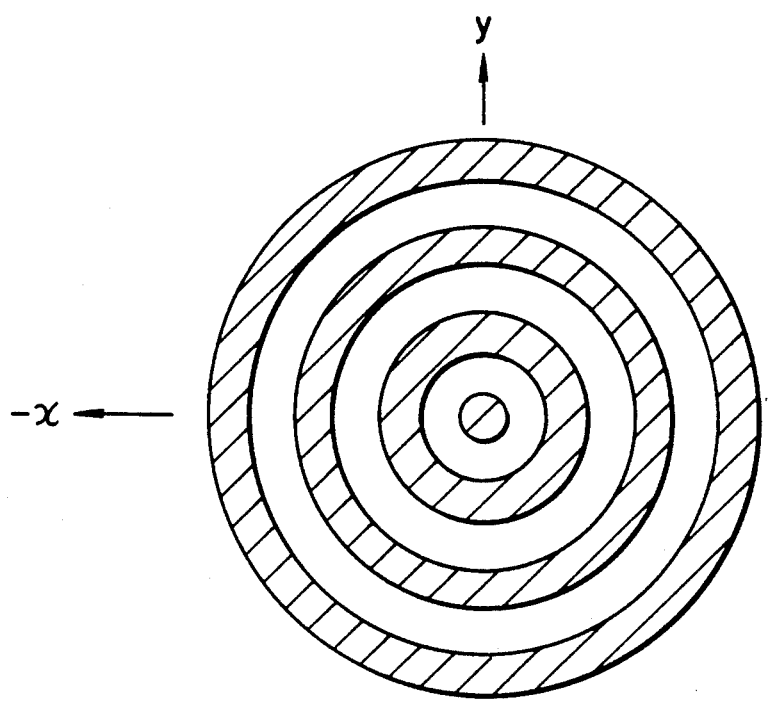

FIG. 3a is a plane view showing patterns of the upper electrodes 75. That is, the upper electrode patterns are concentrically circular. With this arrangement, a concentric electric field distribution can be obtained.

Figure 3B:
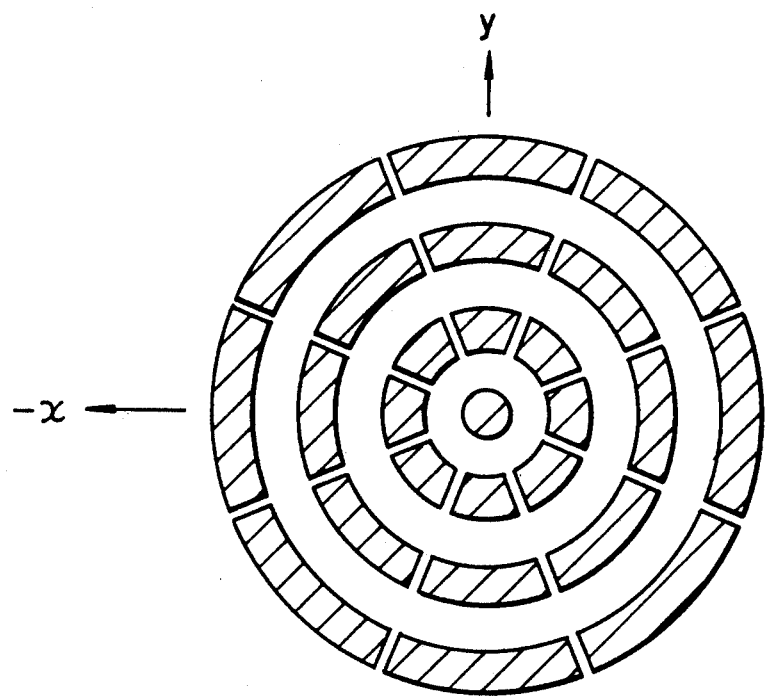

FIG. 3b is a plane view showing a variant form of the upper electrode patterns in which the concentric circular electrodes as shown in FIG. 3a are circumferentially divided into segments which are radially aligned. With this arrangement, an elliptic electrical field distribution can be obtained.

Next, explanation will be made of a method of producing the refraction index distribution changeable lens according to the present invention.

Referring to FIG. 2a, GaAs layers and 10 nm $Al_{0.3}Ga_{0.7}As$ layers are alternately laminated by 80 periods to form the multiple, quantum well layer 72 on the GaAs substrate 71 using a molecular beam epitaxial process. Then a 100 nm $Al_{0.3}Ga_{0.7}As$ cap layer is formed. Thereafter, the upper and lower electrodes 75, 76 are formed. These electrodes are transparent electrodes made of indium tin oxide or the like. It may be a partially transparent electrode made of Cr, Au or the like. The upper electrodes 75 are patterned by a photoresist process to obtain the patterns as shown in FIG. 3a or 3b. Thereafter, the regularity of the multiple quantum well layer are formed between the electrode patterns by ion implantation using chromium, oxygen or the like. The $Al_{0.3}Ga_{0.7}As$ layer is selectively removed by etching to obtain insulation between the elements. As mentioned above, the refractive index distribution changeable lens can be obtained. Further, in order to obtain the structure shown in FIG. 2b, the lower electrode 76 is patterned by a photoresist process, and thereafter, the substrate is partly removed by etching. If the $Al_{0.3}Ga_{0.7}As$ cap layer 73 and the multiple quantum well layer have high resistances, the disturbing of the regularity of the well layer and the removal of the cap layer by etching are not necessary.

Figure 3D:
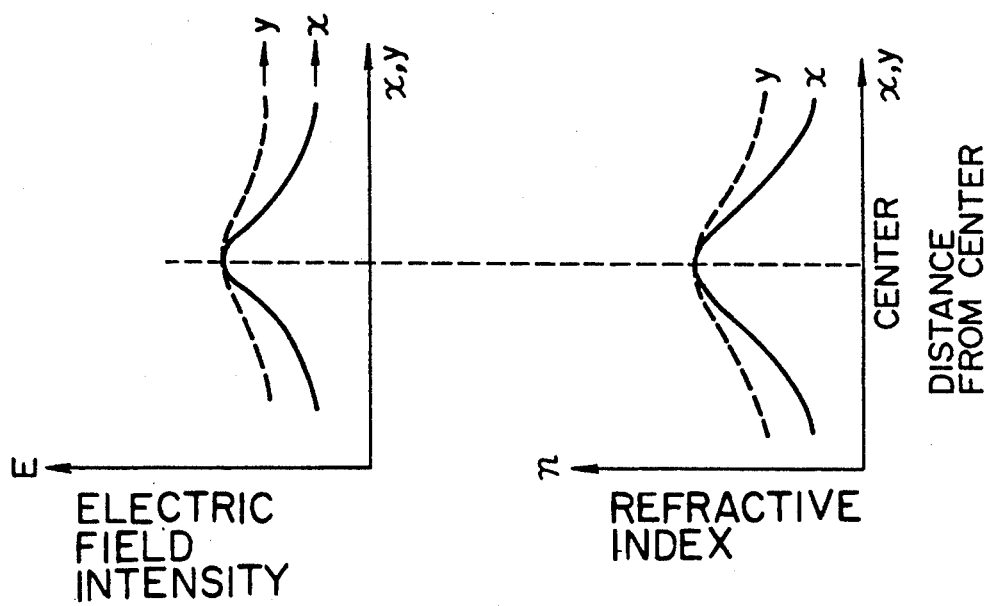
FIG. 3d is a graphical view showing a refractive index distribution of the lens shown in FIG. 3b together with a distribution of the intensity of an electrical field.
Figure 3C:
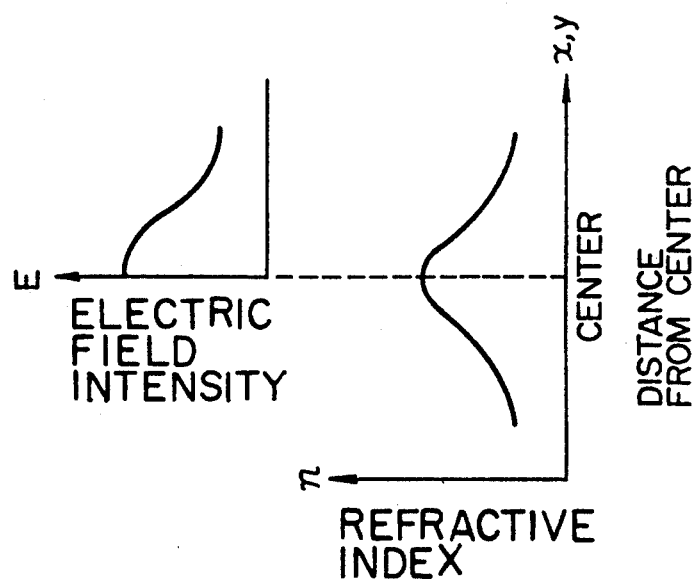
FIG. 3c is a graphical view showing a refractive index distribution of the lens shown in FIG. 3a together with a distribution of the intensity of an electric field.

FIG. 3c shows a refractive index distribution in one plane which is obtained by applying a Gauss distribution electric field with the use of the electrodes shown in FIG. 3a. The refractive index distribution is symmetrical with the highest value at the center. Further FIG. 3d shows a refractive index distribution obtained by the electrodes shown in FIG. 3b. In this case, the applied electric field is highest at the center and higher in the X-direction than in the Y-direction.

Figure 4:
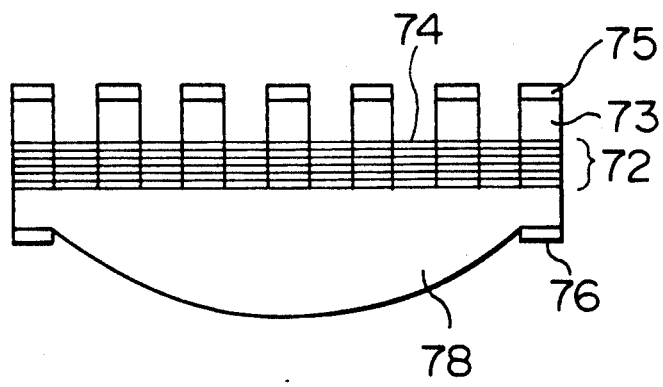

FIG. 4 shows a variant form of the refraction index distribution changeable lens shown in FIG. 2a. This lens has the same structure as that shown in FIG. 2a, except that the lower section of the substrate 71 is formed with an objective lens 78 by machining or etching. That is, the refractive index distribution changeable lens and the objective lens are integrally incorporated with each other.

It has been explained that the semiconductor multilayer heterostructure of the refractive index distribution changeable lens is made of GaAs and AlGaAs. However, the semiconductor multilayer heterostructure may be made of at least two materials selected from a group consisting of InP, InAs, GaSb, InGaAs, InGaAsP, InGaAlP, InGaAlAs, AlGaSb, InGaP, GaAsP, InAlAs, GaN, AlN, ZnS, ZnSe, ZnSSe, Si and Ge. Thus the obtained heterostructure can give a refractive index distribution changeable lens for a wavelength range from 0.4 $\mu$m to 3 $\mu$m, which range cannot be obtained by the combination of GaAs and AlGaAs. The heterostructure using the above-mentioned materials can be formed by a molecular beam epitaxial process, an organo-metallic vapor phase epitaxial process or a gas source molecular beam epitaxial process.

Figure 5:
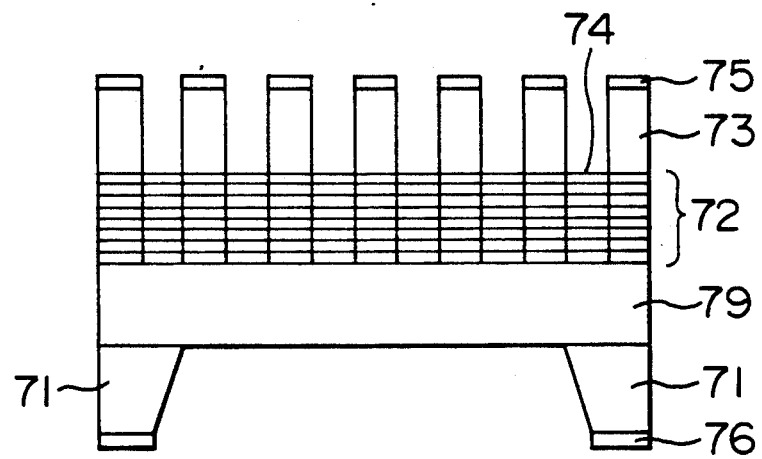

Explanation will be made hereinbelow of a method of producing a refractive index distribution changeable lens which is effective for 0.6 $\mu$m band light with reference to FIG. 5.

100 nm $(Al_{0.35}Ga_{0.65})_{0.51}In_{0.49}P$ buffer layer 78 is formed on a GaAs substrate 71 by a molecular beam epitaxial process, and thereafter, 8 nm $Ga_{0.51}In_{0.49}P$ layers and 10 nm $(Al_{0.35}Ga_{0.65})_{0.51}In_{0.49}P$ layers are alternately laminated by 80 periods so as to obtain a multiple quantum well layer. Further, 100 nm $(Al_{0.35}Ga_{0.65})_{0.51}In_{0.49}P$ cap layer 73 is formed.

Thereafter, upper electrodes 75 and a lower electrode 76 are formed. The electrodes are transparent electrodes made of indium tin oxide or the like. It is also formed of partially transparent electrodes made of Cr, Au or the like. Then the upper electrodes are patterned with the use of a photoresist process to obtain patterns as shown in FIG. 3a or 3b, Thereafter, the well layer is formed between the electrode patterns by ion implantation using chromium, oxygen or the like, and the cap layer above the well layer is selectively removed by etching to obtain insulation between the elements. Then, the lower electrode 76 is patterned using a photoresist process, and thereafter, the GaAs substrate is partly removed by etching to obtain a refractive index distribution changeable lens. In the thus formed lens, since the GaAs substrate cannot pass 0.6 $\mu$m band light therethrough, the GaAs is removed by etching. However, if a substrate which can pass 0.6 $\mu$m band light therethrough, is used, a refractive index distribution changeable lens similar to that shown in FIG. 2a can be formed. Further, it has been explained that the cap layer 73 is removed by etching, in parts where no upper electrodes are present, and the well layer 72 is formed by ion implantation. However, these steps are not necessary if the layers 73 and 72 have high resistances, respectively.

Further, if a refractive index distribution changeable lens integrally incorporated with an objective lens as shown in FIG. 4, is formed and if the substrate cannot pass 0.6 $\mu$m band light as mentioned above, the thickness of the $(Al_{0.35}Ga_{0.65})_{0.51}In_{0.49}P$ buffer layer is set to 50 $\mu$m, after the GaAs substrate removed by etching, the buffer layer 78 is formed into a lens-like shape by etching obtain an objective lens.

Figure 6:
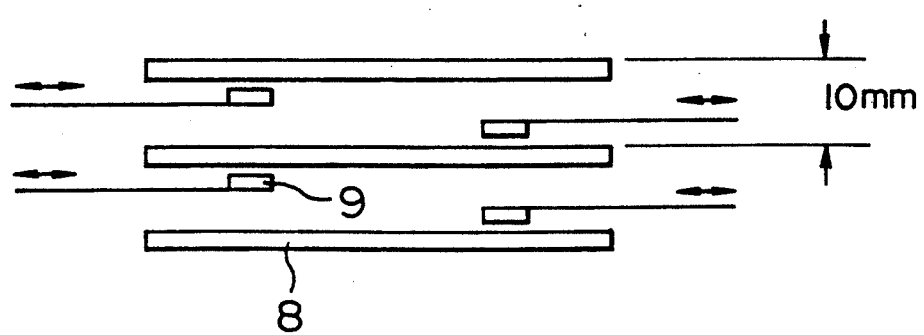
FIG. 6 is a sectional view illustrating slider bearings on each of which the optical head shown in FIG. 1 is mounted.

FIG. 6 shows an optical disc unit in which several optical discs are provided in order to obtain a large data capacity. In FIG. 6, eight optical discs are used. It is desirable to decrease the space between the adjacent discs as far as possible. By use of the optical head device explained in the above-mentioned embodiment, the space between the adjacent discs is set to about 10 mm in order to obtain a spatial margin for the movement of the optical head between the discs. With the optical heads 9 mounted on slider bearings, according to the present invention, a float-up lift obtained by the air bearing effect is set to about 1 mm at maximum.

With this arrangement, any undulation and warp on the surface of disc can be absorbed by floating up the optical head floating above to allow the optical head to substantially follow the disc surface, and further, with the use of the refraction index distribution changeable lens, it is possible to displace the focal point by 20 $\mu$m at maximum. Thereby, the light can be focused to the disc surface with a high degree of accuracy.

Next explanation will be made of a second embodiment of the present invention with reference to FIGS. 7 to 9a.

Figure 7:
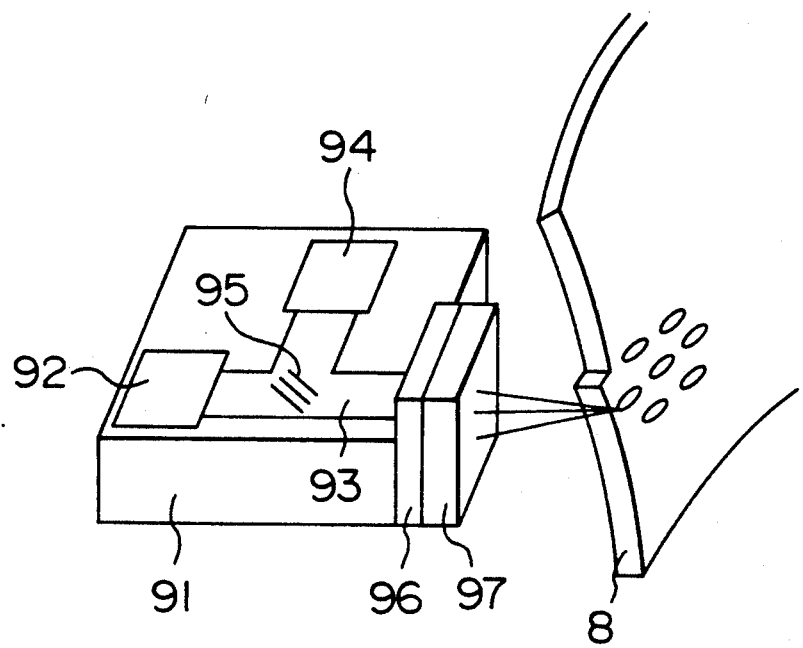
FIG. 7 is a perspective view illustrating a second embodiment of the present invention.

FIG. 7 is a perspective view illustrating a second embodiment of an optical head according to the present invention. In FIG. 7, there are shown a GaAs substrate 91, a semiconductor laser 92 formed on the substrate 91 using an epitaxial growth process, a light wave guide 93 formed on the substrate 91 and made of dielectric materials, a photodiode 94 formed on the substrate 91 by an epitaxial growth process, a reflective type Bragg diffraction grating 95 formed on the substrate 91 and made of electro-optical dielectric materials or compound semiconductor materials, a ½ wavelength plate 96, and a refractive index distribution lens 97. All these elements except 96 and 97 are monolithically integrated with the substrate 91, since the substrate is made of GaAs materials. Accordingly, the optical head in this second embodiment can become more compact than that mentioned in the first embodiment. Further, in this figure, an optical disc 8 is also shown.

Polarized light emitted from the semiconductor laser 92 is transmitted through the light wave guide 93 and through the reflective type Bragg diffraction grating 95 without being reflected by the latter. Further, the emitted light exists the light wave guide 93, and is turned into a circularly polarized light by the ¼ wavelength plate 96, and is focused by the refractive index distribution lens 97 onto the recording surface of the optical disc 8. Light reflected from the recording surface of the optical disc 8 is led through the lens 97 and turned into incident light having a polarized plane which is different from that of the emitted light by 90 deg., by the ¼ wavelength plate 96. Then the reflected light is diffracted by the reflective type Bragg diffraction grating 95 onto the photodiode 94 which produces a recorded signal and a focusing error signal. The focusing error signal is turned into a voltage applied to the refraction index distribution changeable lens 97 through an external circuit which is not shown. Thus, by feed-back of the focusing error signal, the refractive index distribution of the lens 97 can be changed to microadjust a focus point of the emitted light to follow the recording surface of the optical disc 8 without deviation.

It is noted that the optical head in this second embodiment can be used, similar to that mentioned in the first embodiment. Further, the refractive index distribution changeable lens 97 has the same heterostructure as that mentioned in the first embodiment, and accordingly, it can be produced in the same method as mentioned in the first embodiment. Accordingly, the detailed description thereof will be eliminated for the sake of brevity.

Figure 8:
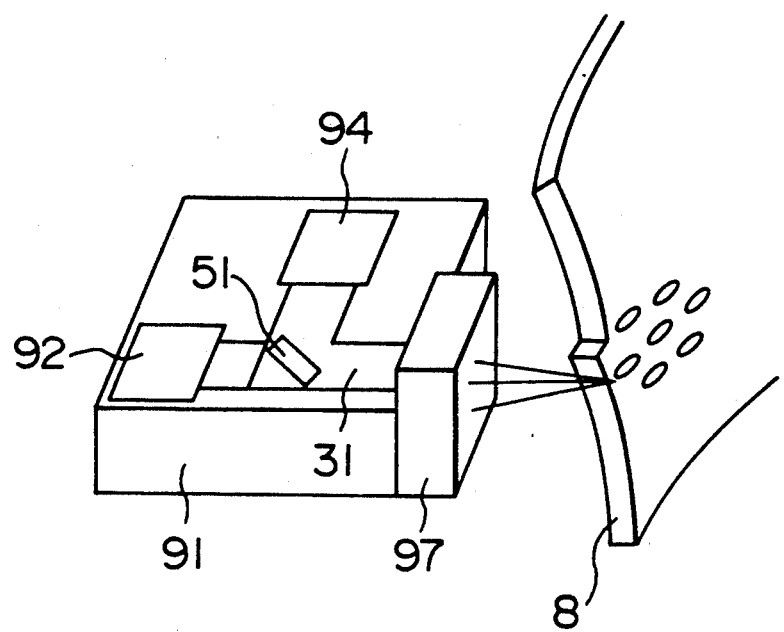
FIG. 8 is a perspective view illustrating a variant form of the second embodiment shown in FIG. 7.

FIG. 8 is a schematic perspective view illustrating a variant form of the optical head shown in FIG. 7. This optical head in a variant form has the same structure as that shown in FIG. 7, except that an optical switch 51 is used in stead of the reflective type Bragg diffraction grating 95. This optical switch is a light polarizing optical switch formed in the light wave guide 31 and having a super-lattice structure.

This optical switch is formed by laminating first and second semiconductor layers having different forbidden band gaps and selected from periodic table group III to V group of compound semiconductor materials such as GaAs or InP type. These compound semiconductor materials change their refractive indices due to the movement of the absorption edge. Thereby, the optical switch made of these material can have a compact size in comparison with a conventional light polarizing type optical switch made of electro-optical materials such as lithium niobate or the like. The lithium niobate material exhibits small variations in refractive index with respect to an applied voltage, and accordingly, the conventional optical switch has a long length, and requires a high operational voltage.

In the optical switch according to the present invention, a super-lattice film in which first and second semiconductor layers formed by epitaxial growth and having different forbidden band gaps are laminated alternately forms the light wave guide, and accordingly, the optical switch can be obtained by forming electrodes in a part where the light wave guide branches out. Variations in the refractive index in light polarizing optical switch fall within a range of $\pm 0.3$, and accordingly, the separation angle of the light wave guide can be set to 45 deg. Thus, the length of the light wave guide can be made as short as about 1 mm, thereby it is possible to form a miniature and lightweight optical head.

Figure 9A:
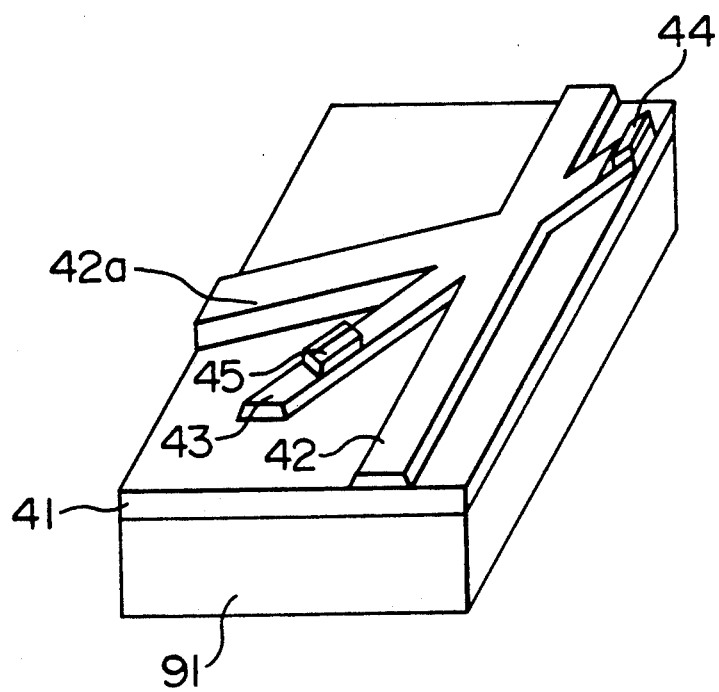
FIG. 9a is a light deflecting type optical switch mounted on a light wave guide and used in the arrangement shown in FIG. 8.
Figure 9B:
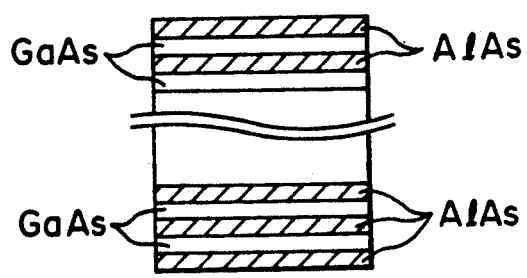
FIG. 9b is a sectional view illustrating a super lattice structure, of the optical switch.
Figure 10:
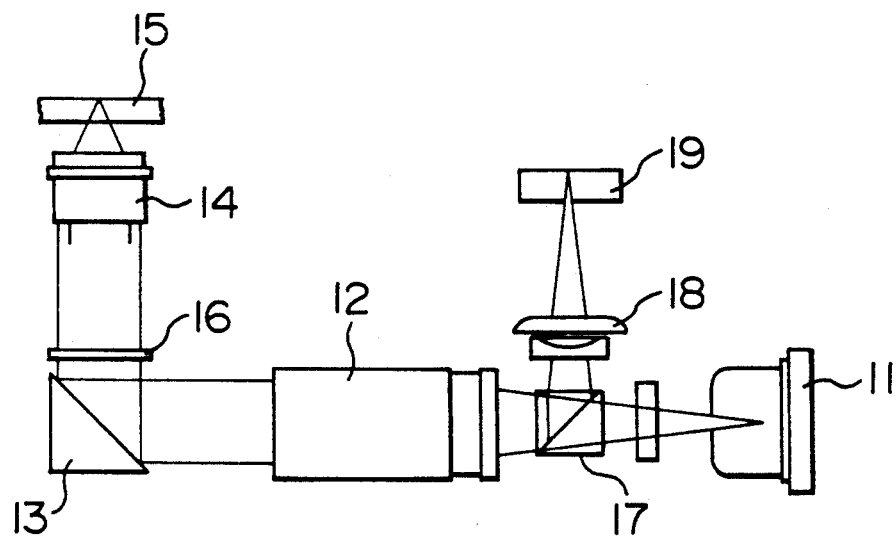
FIG. 10 is a sectional view illustrating a conventional optical head apparatus.
Figure 11:
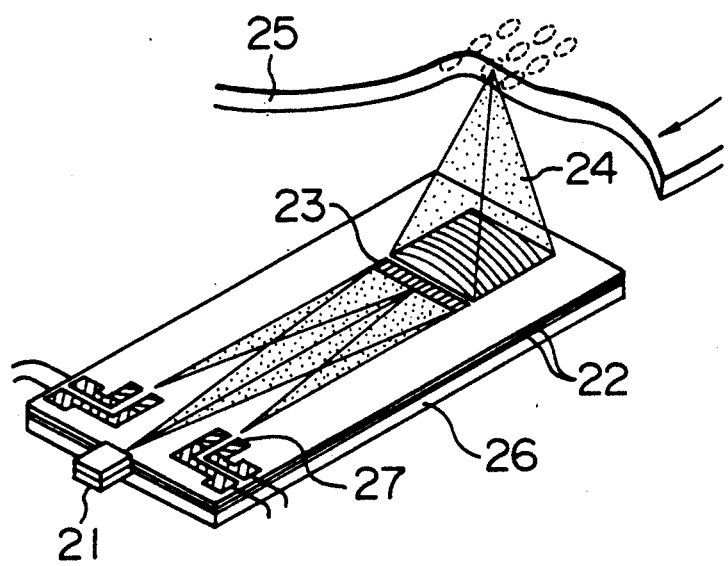
FIG. 11 is a perspective view illustrating a conventional integrated optical head.

Next, explanation will be made of the light polarizing optical switch having a light wave guide structure and using the above-mentioned super-lattice structure, and the method of manufacturing thereof with reference to FIGS. 9a and 9b.

A light wave guide type optical switch using a field effect of a super-lattice effect is disclosed, for example Journal of Electronics Letter, Vol. 21, 1985, pages 693 to 694. The application of an electric field can be made in two ways. That can be, it is applied perpendicularly or parallel to the joint surfaces of heterostructure-semiconductor layers.

In this embodiment, the application of an electrical field in parallel with the joint surfaces of the heterostructure-semiconductor layers is selected in view of the simplicity of manufacture, thereof. However, the application of an electric field perpendicular to the joint surfaces of heterostructure-semiconductor layers can be also selected in the present application. FIG. 9a is a perspective view illustrating a light polarizing optical switch having a light wave guide structure, and FIG. 9b is an enlarged view illustrating the super-lattice structure thereof. In these figures, there are shown a GaAs substrate 91, an $Al_{0.3}Ga_{0.7}As$ layer 41 having a thickness of 2 μm for preventing venting light from straying out, a super-lattice light wave guide 42 in which 100 Å AlAs layer and 100 Å GaAs layer are laminated by 500 periods, a super-lattice light wave guide 42a for guiding return light to a photodetector which is not shown in these figures, a super-lattice switch part 43 having the same structure as that of the light wave guide, and electrodes 44, 45 for applying an electric field to the super-lattice switch part 43. The light wave guide part has a width of 25 μm and a height of 10 μm, and further, the switch part has a width of 5 μm and a height of 10 μm. Super-lattice layers underneath the two electrodes 44, 45 on the super-lattice switch 43 are formed in n-type and p-type, respectively, using Si implantation and Zn diffusion.

The above-mentioned light polarizing optical switch is produced by a method consisting of the following process steps:
(i) growing the Alhd $0.3Ga_{0.7}As$ layer, the super-lattice light wave guide 42 and the super-lattice switch part 43 using a molecular beam epitaxial growth process;
(ii) forming the light wave guide part and the switch part using an ion milling process; and
(iii) conducting Si implantation and Zn diffusion
(iv) forming the electrodes 44 and 45.

The operation of the above-mentioned light polarizing optical switch having a light wave guide structure will be explained.

When no bias voltage is applied between the electrodes 44, 45, since the refractive indices of the light wave guide part and the switch part are equal to each other, no reflection of light occurs at the switch part. However, when a suitable bias voltage is applied between the electrodes 44, 45, the refractive index of the switch part is lowered so that the return light is totally reflected, and accordingly, the light path of the return light is turned toward the super-lattice light wave guide 42a.

Although it has been explained that the refractive index of the super-lattice layer is changed by applying a bias voltage to the electrodes formed by P-N junction, a similar effect can be obtained by use of electrodes formed by short-key junction. Although GaAs group materials have been used, InGaAs group materials can be similarly used.

The present invention has been heretofore detailed in the specific embodiments form. However, the present invention should be limited to the above-mentioned embodiments, but the concept and the arrangement of the invention may be broadly changed with the scope of the invention which can be only defined by the appended claims.

What we claim is:

1. An optical head for recording and reproducing information to and from a surface of an optical disc, comprising:

a light source for emitting a first light;

a light path connected to the light source for transmitting said first light;

a beam splitter connected to the light path for directing and reflecting light, said beam splitter directing said first light toward the surface of the optical disc;

an objective lens interposed between the beam splitter and optical disc surface for focusing the first light directed by said beam splitter onto the surface of the optical disc;

a refractive index distribution changeable lens interposed between the objective lens and the optical disc surface for controlling a focus point of the first light on the surface of the optical disc, said refractive index distribution changeable lens being composed of a lens body having first and second surfaces, a patterned electrode formed on said first surface and a common electrode formed on said second surface;

a second light reflected by the surface of the optical disc onto said beam splitter for passing through said refractive index distribution changeable lens;

a photodetector for receiving and converting the second light reflected from said beam splitter into adjustment signals; and a control means for controlling an electric field applied between said patterned electrode and said common electrode so as to control distribution of said refractive index distribution changeable lens in accordance with adjustment signals from said photodetector.

2. The optical head according to claim 1, wherein said light path, said beam splitter and said photodetector are integrated on the semiconductor substrate.

3. The optical head according to claim 2, wherein said light path is a light wave guide, and said beam splitter is a grating coupler.

4. The optical head according to claim 1, wherein said refractive index distribution changeable lens is made of at least one material selected from a group of materials having a semiconductor multi-layer heterostructure, liquid crystal materials and materials having an electro-optic effect.

5. The optical head according to claim 4, wherein said refractive index distribution changeable lens has a concentric circular refractive index distribution when a concentric circular electric field is applied to said patterned electrode.

6. The optical head according to claim 4, wherein said refractive index distribution changeable lens has an elliptic refractive index distribution when an elliptic refractive electric field is applied to said patterned electrode.

7. The optical head according to claim 2, wherein said refractive index distribution lens and said objective lens are integrally incorporated with each other.

8. The optical head according to claim 4, wherein said refractive index distribution changeable lens is made of at least two materials selected from a group consisting of GaAs, AlGaAs, InP, InAs, GaSb, InGaAs, InGaAsP, InGaAlP, InGaAlAs, InGaP, GaAsP, AlGaSb, InALAs, GaN, AlN, ZnS, ZnSe, SnSSe, Si and Ge.

9. An optical head for recording and reproducing information to and from a surface on an optical disc, comprising:
a semiconductor substrate;
a light source monolithically formed on said substrate;
a light wave guide monolithically formed on said substrate and having at least three ends;
a refractive index distribution changeable lens monolithically formed on said substrate, for focusing a first light emitted from said light source and transmitted along said light wave guide, onto the surface of the optical disc, said refractive index distribution changeable lens comprising a lens body having first and second surfaces, a patterned electrode formed on said first surface and a common electrode formed on said second surface;
a photodetector monolithically formed on said substrate, for converting a second light reflected from the surface of the optical disc into a signal after said second light passes through an objective lens and said refractive index distribution changeable lens and transmitted along said light wave guide;
a switch means monolithically formed on said substrate, for reflecting said second light toward said photodetector;

a control means for changing an electric field applied between said patterned electrode and said common electrode to control distribution of refractive index of said refractive index distribution changeable lens so as to precisely control a position of a focus point of the first light on the recording surface of the optical disc.

10. The optical head according to claim 9, wherein said switch means is a reflective type Bragg diffraction grating.

11. The optical head according to claim 10, wherein said Bragg diffraction grating is made of dielectric electrochemical material or compound semiconductor material.

12. The optical head according to claim 9, wherein said switch means is an optical switch.

13. The optical head according to claim 10, wherein said optical switch has a super-lattice heterostructure which is disposed in said light wave guide and which is formed of first and second semiconductor layers having different forbidden band gaps alternately laminated.

14. The optical head according to claim 12, wherein said optical switch has a super-lattice heterostructure which is disposed in said light wave guide and which is formed of n-type and p-type semiconductor layers alternately laminated.

15. An optical head for recording and reproducing information to and from a surface of an optical disc comprising:
a light source for emitting a first light;
a light path connected to said light source for transmitting said first light;
a beam splitter connected to said light path for directing and reflecting light, said first light being directed toward the surface of the optical disc by said beam splitter;
an objective lens interposed between the beam splitter and the optical disc for focusing the first light directed from said beam splitter onto the surface of the optical disc;
a refractive index distribution changeable lens interposed between the objective lens and the optical disc for controlling a focus point of the first light on the surface of the optical disc, said refractive index distribution changeable lens comprising of a lens body having first and second surfaces, a patterned electrode formed on said first surface and a common electrode formed on said second surface and said refractive index distribution changeable lens being made of at least two materials selected from a group consisting of GaAs, AlGaAs, InP, InAs, GaSb, InGaAs, InGaAsP, InGaAlP, InGaAlAs, InGaP, GaAsP, AlGaSb, GaN, ALN, ZnS, ZnSe, ZnSSe, Si and Ge;
a second light reflected by the surface of the optical disc onto said beam splitter after passing thorough said refractive distribution changeable lens and said objective lens and reflected by said beam splitter;
a photodetector receiving and converting the second light from said beam splitter into adjustment signals;
a control means for controlling an electric field applied between said patterned electrode and said common electrode so as to control distribution of refractive index of said refractive index distribution changeable lens in accordance with the adjustment signals from said photodetector.

* * * * *